United States Patent [19]
Brenholdt

[11] 3,791,741
[45] Feb. 12, 1974

[54] SIZE GAUGING AND QUALITY INSPECTING ROTATING ARTICLES BY IMAGING ONTO SPATIAL FILTERS AND DETECTORS

[75] Inventor: Irving R. Brenholdt, Greenwich, Conn.

[73] Assignee: Farrand Optical Co., Inc., Valhalla, N.Y.

[22] Filed: Sept. 28, 1971

[21] Appl. No.: 184,475

[52] U.S. Cl. .......... 356/163, 356/237, 250/291 DF, 250/219 WD, 250/223 B
[51] Int. Cl. .......................................... G01b 11/00
[58] Field of Search ... 356/157, 158, 159, 160, 163, 356/240, 72, 102, 237; 250/219 DF, 219 WD, 219 LG, 219 R, 223 B

[56] References Cited
UNITED STATES PATENTS

| | | | |
|---|---|---|---|
| 3,620,629 | 11/1971 | Whittington | 356/160 |
| 3,094,623 | 6/1963 | Weiss | 356/160 |
| 3,639,067 | 2/1972 | Stephens | 356/240 |
| 3,586,445 | 6/1971 | Martin | 356/159 |
| 3,519,351 | 7/1970 | Lerwill | 250/219 LG X |
| 3,448,278 | 6/1969 | O'Brien et al. | 250/219 WD |
| 3,436,555 | 4/1969 | Foster | 250/219 DF X |
| 3,365,699 | 1/1968 | Foster | 250/223 B UX |
| 3,283,898 | 11/1966 | Calhoun | 356/240 X |

Primary Examiner—Ronald L. Wibert
Assistant Examiner—Paul K. Godwin
Attorney, Agent, or Firm—Barnes, Kisselle, Raisch & Choate

[57] ABSTRACT

Articles to be inspected are moved in a predetermined path through two successive inspection stations forming a part of a gauging assembly and are continuously rotated while moving through the inspection stations. The portion of the article to be gauged is illuminated at each inspection station and an image of the illuminated portion is directed through spatial filters of the Ronchi ruling type onto optical sensors which sense the modulation of the light passing through the spatial filters. The modulated light is then electronically measured to produce electronic signals corresponding to the dimension or dimensional variation being inspected and, in addition, is compared with predetermined standards to produce a reject signal when the deviation from the predetermined standards is beyond a predetermined amount.

37 Claims, 19 Drawing Figures

SIZE GAUGING AND QUALITY INSPECTING ROTATING ARTICLES BY IMAGING ONTO SPATIAL FILTERS AND DETECTORS

This invention relates to inspecting articles for dimensional variations and particularly to inspecting the end or finish of hollow glass articles for variations in diameter and surface finish.

BACKGROUND OF THE INVENTION

In the manufacture of articles such as hollow glass articles such as containers or bottles having an open end, commonly called a finish, it is necessary to insure that the diameter and surface of the finish are within predetermined specifications in order that the closure can be readily applied to the container.

Heretofore, it has been common to inspect for such dimensional variations by mechanical means which directly engage the article or by optical means wherein the article is positioned or moved between precisely spaced beams of light.

Among the objects of the invention are to provide a method and apparatus for inspecting articles for dimensional variations which will provide accurate information; which can be utilized to inspect articles moving continuously and without interruption in a predetermined path; wherein the inspection can be made at speeds well above the speeds utilized in glass forming machinery; which method and apparatus is particularly adapted for use in the inspection of the finish of hollow glass articles; and which method and apparatus can be utilized in the environment of glass article making machinery.

SUMMARY OF THE INVENTION

In accordance with the invention, the articles to be inspected are moved in a predetermined path through two successive inspection stations forming a part of a gauging assembly and are continuously rotated while moving through the inspection station. The portion of the article to be gauged is illuminated at each inspection station and an image of the illuminated portion is directed through spatial filters of the Ronchi ruling type onto optical sensors which sense the modulation of the light passing through the spatial filters. The modulated light is then electronically measured to produce electronic signals corresponding to the dimension or dimensional variation being inspected and, in addition, is compared with predetermined standards to produce a reject signal when the deviation from the predetermined standards is beyond a predetermined amount.

GENERAL DESCRIPTION

The method and apparatus of the present invention is particularly adapted for the inspection of hollow glass containers having open ends, commonly called finishes, for variations in diameter and variations in the surface thereof, although, as will be apparent, the invention can be used for inspecting other types of articles.

Figure 2:
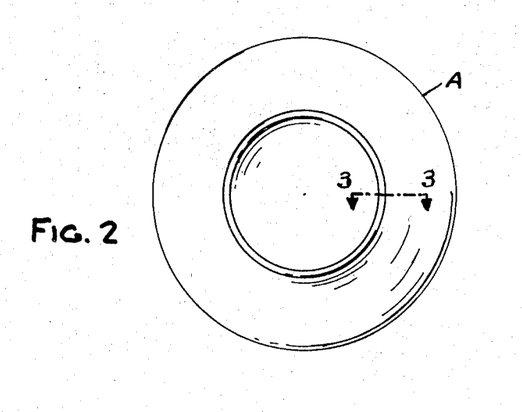
FIG. 2 is a plan view of a typical article being inspected.
Figure 3:
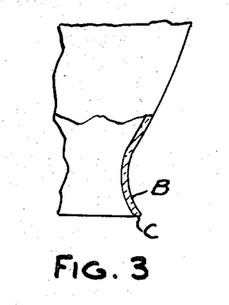
FIG. 3 is a fragmentary part sectional view taken along the line 3—3 in FIG. 2.

Referring to FIGS. 2 and 3, a hollow glass article A is provided with an open end or neck B formed with a bead C. The present invention is directed to inspecting the finish C for variations in diameter and for variations or deviations in the end surface of the finish, commonly known as bumps.

Figure 1:
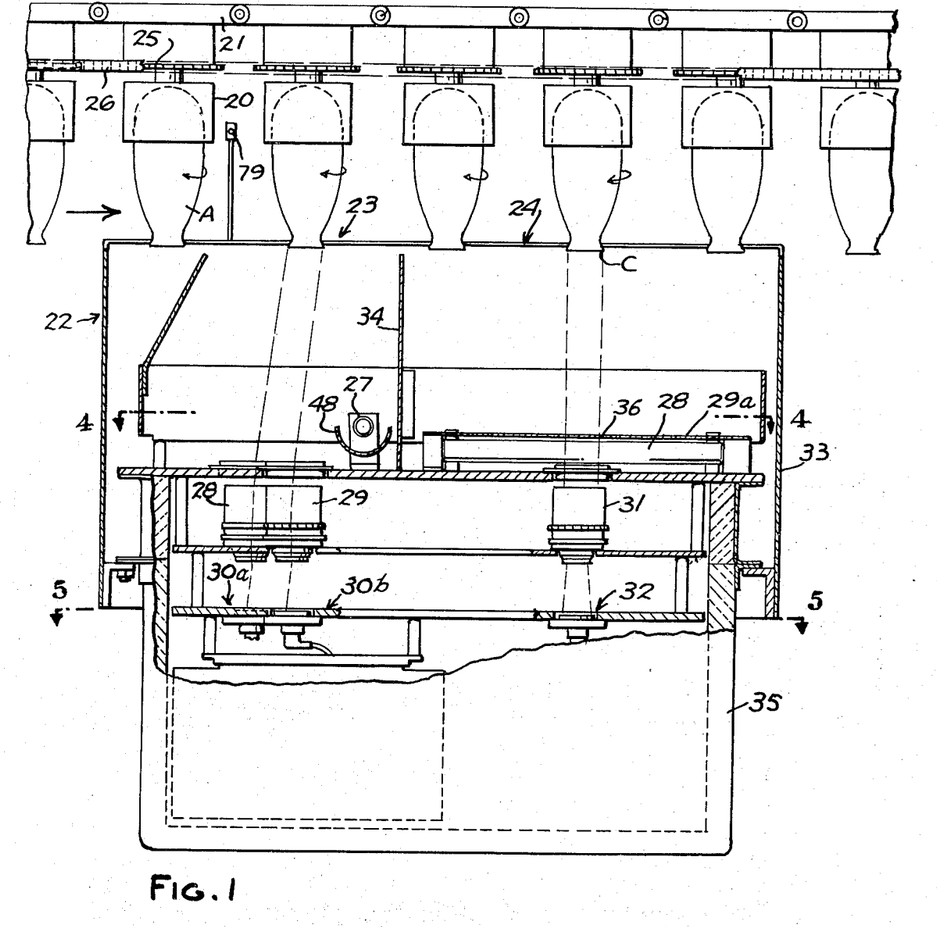
FIG. 1 is a fragmentary part sectional elevational view of an apparatus embodying the invention.

Referring to FIG. 1, in accordance with the invention, the articles A to be inspected are supported in chucks 20 on a conveyor 21 and are moved continuously at high speeds through the inspecting apparatus 22 that comprises successive inspection stations 23, 24. Each article is supported by the chuck 20 so that its finish or open end extends downwardly and each chuck 20 is rotated during its movement by an appropriate apparatus herein shown as a sprocket 25 on each chuck 20 which engages a toothed rack 26 fixed along the path of the chucks 20.

While moving through the first inspection station 23, each article is inspected or gauged for diameter. Light from a source 27 is directed against the article A to illuminate the finish during its movement through the diameter inspection station 23. This produces an illuminated ring on the finish which is focused by spaced lenses 28, 29 onto sensors 30a, 30b, as presently described. The variations or modulations in light in each assembly 30a, 30b are electronically measured and compared to produce the desired measurement and comparison and diameter of the finish. Where the article being inspected is made of a transparent material, such as glass, the lenses 28, 29 preferably have a short depth of field so that defects in the material will not affect the gauging.

Where the article being inspected inherently produces an image, the provision of an active source of illumination may be obviated. For example, where the article being inspected is a hot glass article that emanates infrared radiation, the image of the portion of the article being inspected may not require additional illumination. Similarly, where the portion of the article being inspected emanates fluorescent or phosphorescent radiation or produces an image which can be sensed by the sensors, an active source of illumination will not be needed. The term "illuminating" as used herein is intended to include any mode wherein the portion of the article being inspected emanates or produces an image that can be sensed by the sensors either by the use of an active source of illumination or in any other manner.

While moving through the second inspection station 24, each article is inspected for variations (bumps) in the end surface of the finish. Light from source 28 extending longitudinally of the path of movement is directed through a diffuser or frosted transparent sheet 29a upwardly to illuminate the end surface of the finish C. An image of this surface C is directed through a transparent portion 31a of the sheet 29a and focused by a lens 31 onto a sensor assembly 32. The changes in light sensed by the sensor assembly 32 are then compared with a predetermined standard through electronic means to produce a reject signal if a deviation is produced corresponding to a predetermined surface condition.

Figure 4:
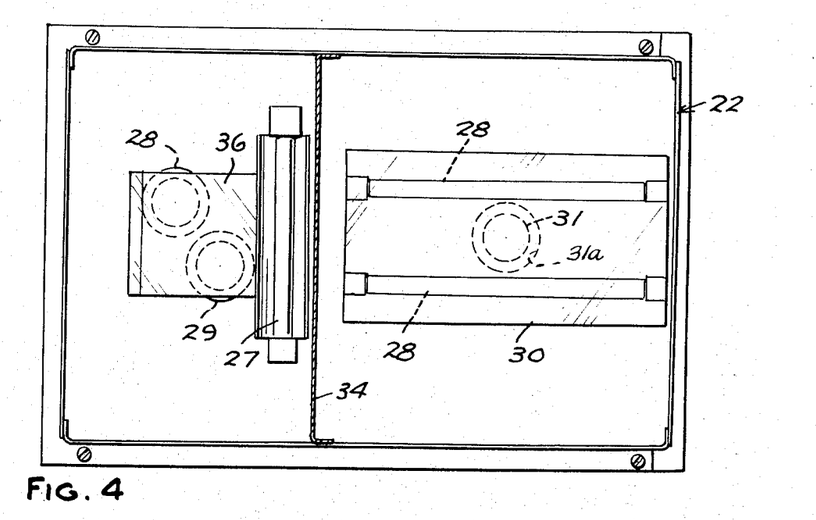
FIG. 4 is a sectional view taken along the line 4—4 in FIG. 1.
Figure 5:
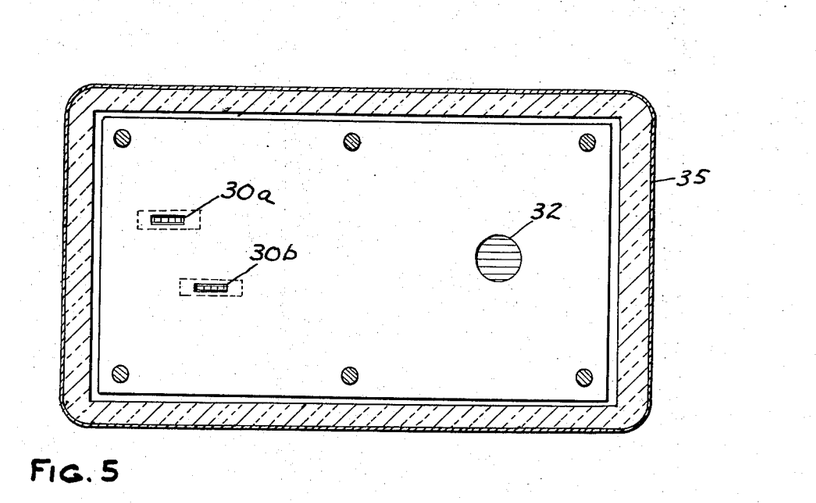
FIG. 5 is a sectional view taken along the line 5—5 in FIG. 1.

As shown in FIGS. 1, 4 and 5, the inspection apparatus includes an open end housing 33 and baffles 34 separating the inspection stations. The apparatus further includes a housing 35 which is insulated and may be cooled to isolate the sensor assemblies 30a, 30b, and 32 (FIG. 5) from the remaining apparatus such as the glass forming machinery and thereby minimizes the tendency for temperature variations to affect the electronic circuitry. As further shown in FIG. 4, transparent plate 36 overlies the lenses 28, 29 to prevent dirt and debris from striking the lenses and from interfering with the inspection.

As shown in FIG. 5, the sensor assemblies 30a, 30b are positioned in longitudinally displaced relationship with one another with respect to the path of movement of the articles and equally on each side of the path of movement. The manner in which the lenses 28, 29 function to direct the image is diagrammatically shown in FIGS. 6 and 7. Sensor assembly 30b will be utilized for sensing the leading edge of the image of the article to be inspected and sensor assembly 30a will be utilized for sensing the trailing edge, as presently described.

Figure 8:
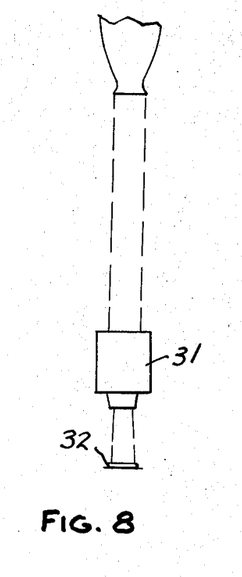
FIG. 8 is a diagrammatic end view showing the relationship of the article being inspected to another portion of the apparatus.
Figure 9:
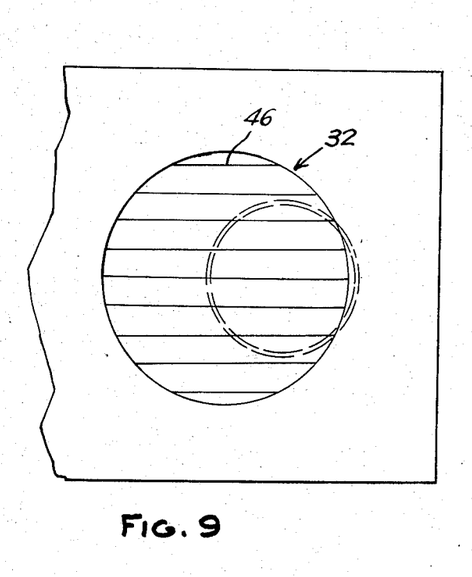
FIG. 9 is a fragmentary partly diagrammatic plan view showing the relationship of the article being inspected to a portion of the apparatus.

The sensor assembly 32 at the second station 24 is positioned directly beneath and longitudinally in alignment with the path of movement of the articles in such a manner that the illuminated image is directed against the assembly 32 as diagrammatically shown in FIGS. 8 and 9.

Figure 10:
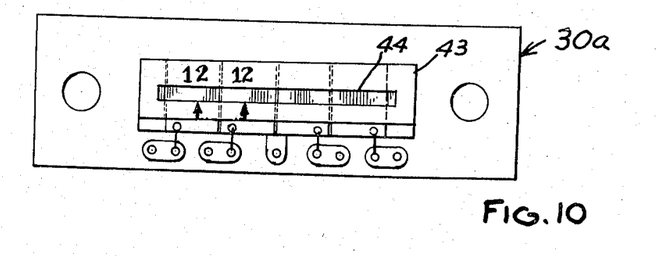
FIG. 10 is a top plan view of a portion of the apparatus.
Figures 11, 12, 13, 14:
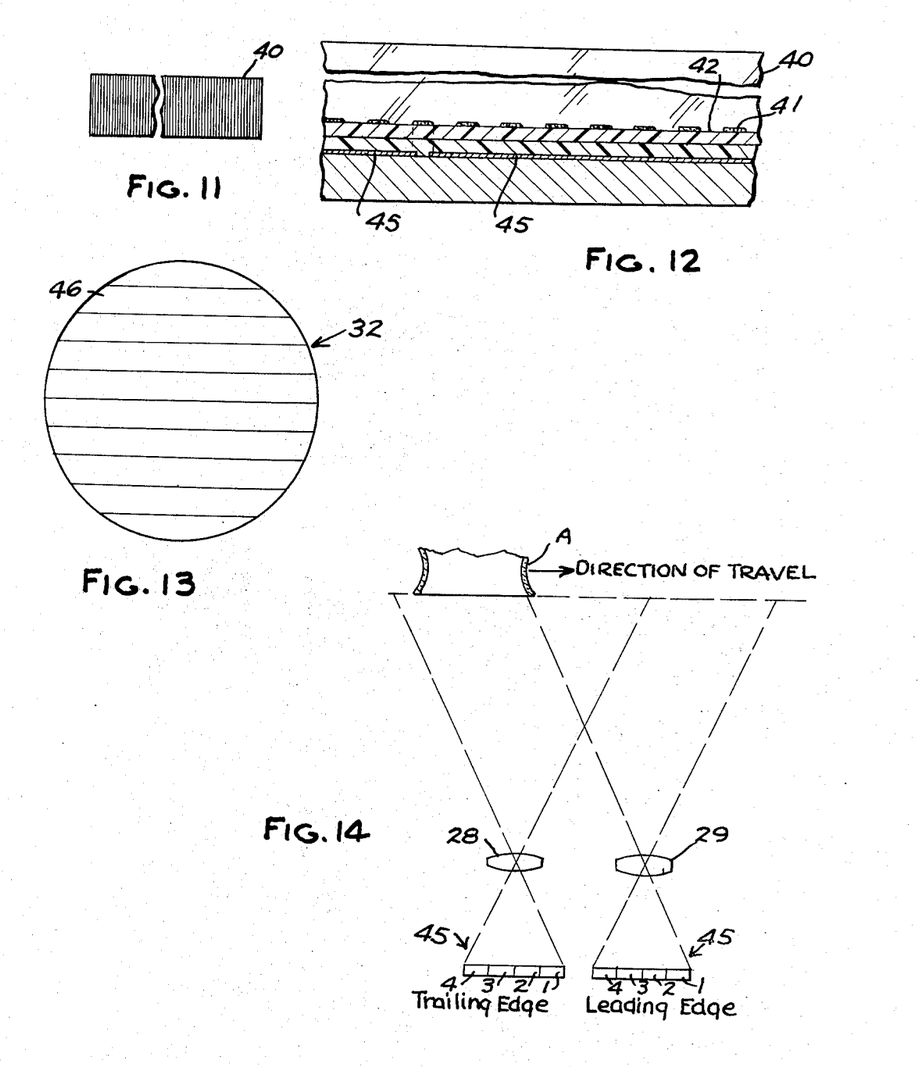
FIG. 11 is a top plan view of a portion of the apparatus on an enlarged scale.
FIG. 12 is a fragmentary sectional view taken along the line 12—12 in FIG. 10.
FIG. 13 is a plan view of another portion of the apparatus.
FIG. 14 is a diagram showing the manner in which a portion of the apparatus functions.

Referring to FIGS. 10-12, each of the assemblies 30a, 30b is identical in construction and comprises a spatial filter 40 of the Ronchi ruling type having opaque rulings 41 separated by transparent spaces of equal width. Ronchi rulings comprise evenly spaced lines running parallel to each other, the width of the line or rulling being equal to the width of the space. Such rulings are well known and are described, for example, in the booklet "Ronchi Rulings and Their Uses," Project No. 9043, Edmund Scientific Co., Barrington, New Jersey, Copyright 1954. The assemblies 30a, 30b further include a mask 43 having an elongated slit 44 exposing only a longitudinal portion of the ruling and isolated light sensitive devices or photo sensors 45, such as silicon detectors, spaced longitudinally beneath the slit 44, herein shown as four in number. The rulings are positioned so that they extend transversely of the longitudinal movement of the article being inspected.

At the second inspection station 24, the sensor assembly 32 comprises a circular disc 46 having Ronchi rulings thereon with the rulings extending parallel to the direction of movement of the articles through the inspection station.

A light sensitive device or photo detector (not shown) such as a silicon detector, is provided beneath the disc 46 to sense the modulations in light passing through the rulings of the disc 46.

In operation, the lenses 28, 29 and 31 focus a reduced image of the illuminated bottle finish onto corresponding spatial filters. The photo detectors located behind each of the spatial filters 40, 46 pick up the resultant modulated light generated by the moving image. These modulated signals from the photo detectors contain information concerning the diameter, ellipticity and bumpiness of the bottle lip.

DIAMETER GAUGING

At the diameter inspection station 23, the bottle finish illumination by source 27 may be provided, for example, by a quartz-iodine lamp extending transversely of the path of travel. The lamp is positioned ahead of the approaching bottles and normal to the direction of travel articles. The lamp is mounted in an assembly which may be covered by a screen to protect it from falling glass or debris. A reflector 48 behind the lamp protects the gauging apparatus from absorbing the heat radiated by the lamp.

Figure 6:
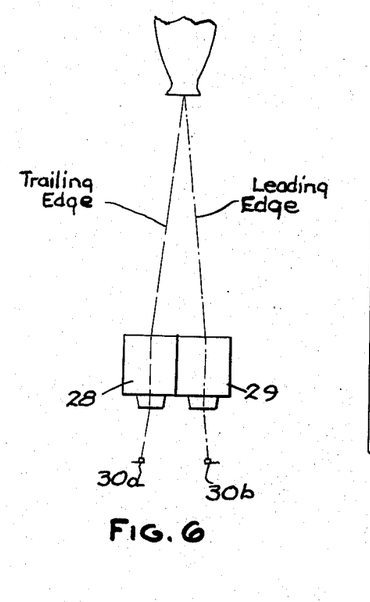
FIG. 6 is a diagrammatic end view showing the relative position of the article being inspected to a portion of the apparatus.
Figure 7:
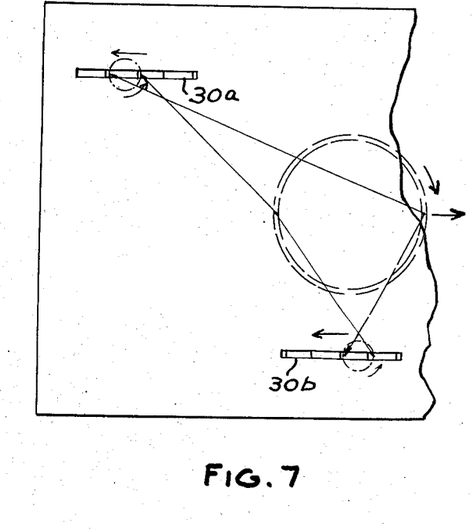
FIG. 7 is a partly diagrammatic plan view showing the relationship of the article being inspected to a portion of the apparatus.

The two optical sensors 45 (for diameter and ellipticity determination) are arranged so that the linear separation between the optical axis is equal to the diameter of the nominal bottle finish. The field of view of each of the sensor modules covers a portion, for example, approximately five inches, of linear travel. The reflected light from the bottle finish is masked by mask 43 so that a strip approximately 0.25 inches high (measured in object space) is employed parallel to the direction of bottle travel and located along the nominal central diameter of the lip. The image of a bottle finish occurs simultaneously at the same off axis angle on both sensor detectors 45 (FIG. 6). This off axis similarity is very important in that the image distortions and aberrations will produce nearly identical image conditions. As the bottle moves along the predetermined path, the image proceeds across the field of view so that the angular image symmetry of both sensors 45 is maintained.

Each sensor or detector 45 is divided into four detector segments 1, 2, 3, 4. In terms of dimensions in the object plane, the linear dimension of one of the segments is chosen to be less than the smallest bottle diameter (i.e., less than 1.37 inches) (FIG. 14). For example, with an equivalent detector length of 1.2 inches, four detectors, butted edge to edge, cover a linear distance of 4.8 inches. This insures that there is no ambiguity in a single detector (i.e., a single detector segment cannot have a leading and trailing edge lip image incident on that segment at the same instant of time).

As previously described, each spatial filter 40 is positioned immediately in the focal plane in front of the detector 45. The pitch of the filter, measured in object space, may, for example, be 0.100 inch (i.e., 0.050 inch of clear aperture and 0.050 of opaque aperture). The minification by lenses 28, 29 of the optical unit may be normally 5:1. The actual length of the detector may be nominally (5 inches/5) = 1 inch. The actual rulings on the spatial filter may be (0.100 inch/5) = 0.200 inch (Pitch). One of the filter opaque lines is arranged to overlay the boundary between the detector segments. In this fashion, no discontinuity in signal output occurs as the bottle finish image traverses the detector.

The illuminated image of the finish is focused simultaneously on the spatial filters and detectors in the leading edge and trailing edge sensor assemblies or channels 30b, 30a. The detectors are divided into four separate segments.

Referring to FIG. 14, as the front edge of the bottle diameter image crosses from segment 1 to segment 2 on the leading edge detector 30b, a logic control switch will shut off the signal from segment 1. This will occur in a short time to assure that the trailing edge image (which will shortly appear on segment 1) cannot give rise to an erroneous start signal. This process continues as the bottle image moves along the detector elements. In effect, the Sector Selector acts as a 4 pole selector switch which automatically indexes to the proper contact position.

The situation is somewhat similar for the trailing edge detector 30a. However, in this instance, we must shut off segment 2 while reading segment 1; shut off segment 3 while reading segment 2, etc., as presently described.

The output signal from the detectors will be amplified and clipped to produce square waves. The advantage of this technique is to produce signals which are independent of amplitude.

The leading and trailing detector signals are converted to pulses which represent the leading edges of their respective square wave output. These well defined signals are fed to a flip-flop which generates a square wave, the width of which is proportional to the displacement of the two pulses. The flip-flop output is fed to an integrator and holding circuit which produces a d.c. voltage proportional to the width of the square wave. In the case of the precise correct diameter bottle, we would generate a square wave which generated the mid-amplitude of the integrator output. Larger diameter bottles would produce wider square waves and higher integrator outputs. Similarly, smaller diameter bottles would produce narrower square waves and lower integrator outputs.

The output of the integrator is then fed to a holding circuit which will maintain the desired voltage level output until the next set of pulses operates the flip-flop. The output of the holding circuit will feed a specially designed circuit which will follow the envelope of the bottle diameter readings and will store in analog form the maximum and minimum diameter readings. These peak analog voltage outputs will, in turn, operate on two circuits.

1. The analog voltage is fed to a comparator circuit which contains the preset information for the reject signal. Signals outside the range of the preset inputs will cause the comparator output to indicate a reject.

2. The analog voltage is converted to BCD and made available to a computer.

Figure 15:
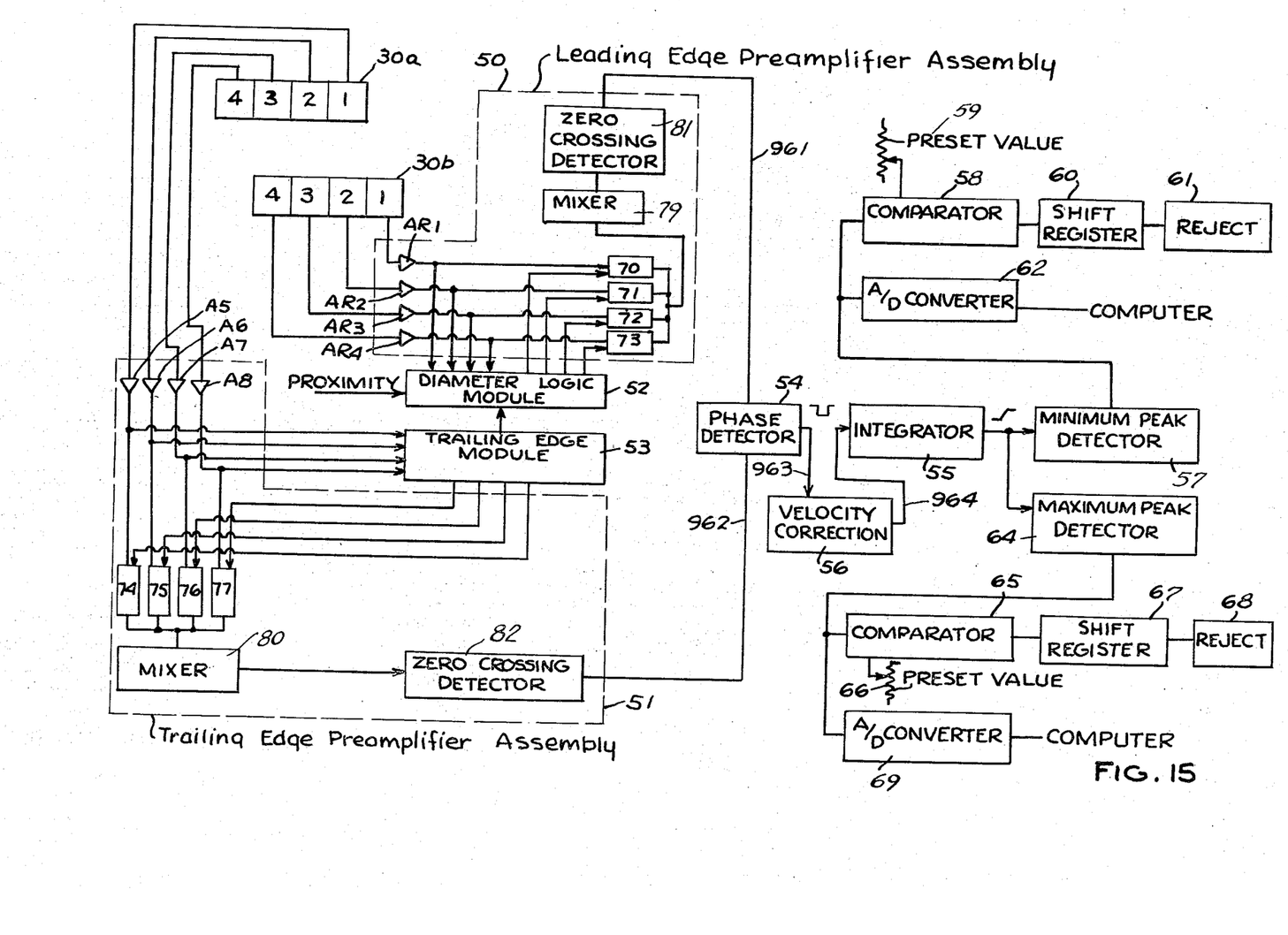
FIG. 15 is a block diagram of a portion of the apparatus.
Figures 15A, 18:
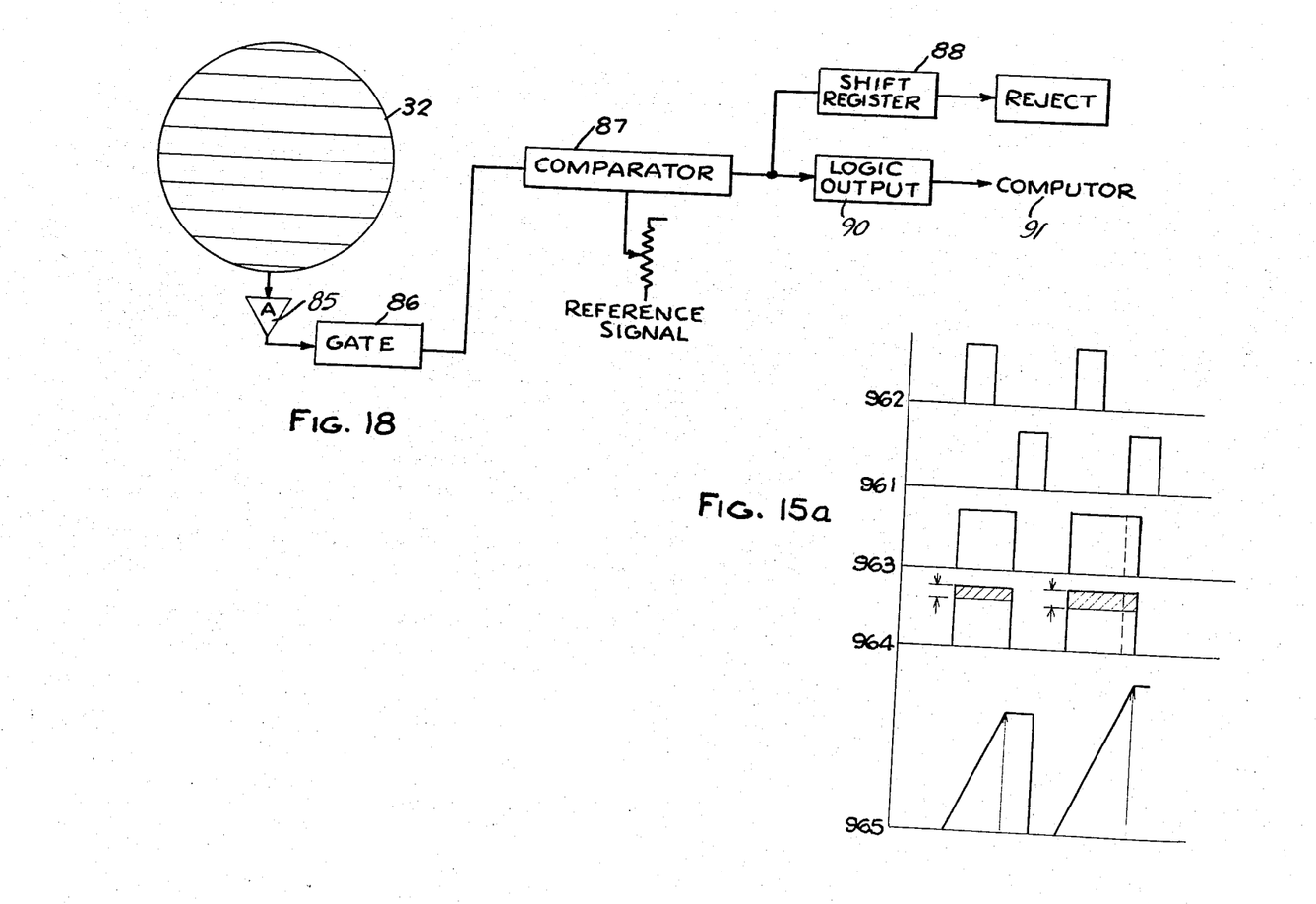
FIG. 15a is a time-pulse diagram of a portion of the apparatus.
FIG. 18 is a block diagram of a further portion of the apparatus.

It should be noted that the width of the square pulses, for example, from phase detector 54 of FIG. 15, is affected by the velocity of bottle travel. To achieve a measurement of bottle diameter independent of bottle velocity, the bottle velocity is measured and used to correct the diameter measurement. This velocity correction is accomplished, for example, by measuring the speed of the bottle conveyor 21 and responsively forming an output voltage proportional to the bottle velocity. This output voltage is then scaled and added to the output pulses from phase detector 54 prior to the integration in integrator 55. Referring to FIG. 15a, the velocity correction is shown for two typical pulses in wave form 964 by the cross-hatched area added to the pulses from wave form 963. With the velocity correction carried out in the manner outlined, the desired independence from bottle velocity is accomplished.

Referring to the block diagram FIG. 5, the signals created by the modulated light from each set of detectors 30a, 30b are directed to a leading edge preamplifier assembly 50 and a trailing edge preamplifier assembly 51. These assemblies amplify the signals from the detectors, gate the signals sequentially, mix the signals, amplify the resultant, invert the signals, drive a pulse standardizer, invert the standardized pulses and provide leading and trailing edge information for a plurality of separate measurements of the diameter of the bottle. Each measurement is proportional to the phase relationship between the pulse train of the output of the leading edge preamplifier 50 and the trailing edge preamplifier 51.

A diameter logic module 52 and the trailing edge gating module 53 function to gate the four channels from each of the detectors 30a, 30b to prevent unwanted signals from being processed through the leading and trailing edge amplifier assemblies 50, 51.

The plurality of pulses from each of the preamplifier assemblies is applied to a phase detector or flip-flop 54 to produce pulses of width corresponding to the diameter, the leading edge pulses producing the leading edge of the resultant pulses and the trailing edge pulses producing the trailing edge pulses. These pulses correpsonding to diameters are then applied to an integrator 55. As previously discussed, the output of the integrator is thus modified by an input obtained by a velocity correction module 56 which continuously monitors the speed of the conveyor 21 so that the output of the integrator 55 is an analog train of pulses varying with diameter and modified by speed of movement of the articles through the inspection station 23.

The output voltage level for each of the integrations is proportional to the diameter measurements indpendent of the velocity of the bottles. The train of integrations (forty-eight in the example given) is fed into a minimum diameter peak detector 57 which retains the minimum diameter measured. This minimum diameter is compared in a comparator 58 with a preset tolerance 59. If the measured level exceeds the preset level, a shift register 60 records the signal to produce a reject signal at the reject station 61 at the desired time if the article exceeds the preset minimum finish diameter.

The output of the minimum diameter peak detector 57 is also fed into the minimum diameter analog to digital converter 62.

Similarly, the train of integrations is fed into a maximum diameter peak detector 64 and, in turn, to a comparator 65 having a preset value 66 which produces a reject signal that is stored in a shift register 67 to actuate a reject mechanism at the appropriate time, if the article finish exceeds the preset maximum diameter. The train of integrations is also fed into the maximum diameter analog to digital converter. The output of the analog to digital converters are BCD (binary coded decimal) logic levels corresponding to the analog outputs of the peak detectors.

The output of the analog to digital converters are fed into the ADC buffer where the logic levels are made compatible with the required inputs of the computer. The ancillary signals are made compatible with the computer input requirements on the computer buffer.

PREAMPLIFIER ASSEMBLIES

These assemblies are substantially identical. The function of these assemblies is to amplify the signals from the silicon detectors, gate the signals sequentially, mix the signals, amplify the resultant, invert this signal, drive a pulse standardizer, invert the standardized pulse and drive the line to the signal processing electronics assembly.

The image of the bottle finish on the spatial filter 40 and segments of detector 45 generates a low frequency signal with higher frequency component on it. This occurs sequentially in each of the four sections of each detector. The output signal of each of the four channels of the detector is a.c. coupled into four identical non-inverting amplifiers, AR1 through AR4.

The output of each amplifier is the amplified higher frequency signal from the detectors. This signal is comprised of two bursts of 12 sinusoidal cycles, in the example given. The first burst is from the leading edge of the finish of the bottle and the second burst is from the trailing edge of the finish. The 12 cycles are generated from each spatial filter 40 in each section of the detector. In the leading edge preamplifier assembly 50, the first burst of signals is of importance. In the trailing edge preamplifier assembly 51, the second burst of signals is of importance. The frequency of the burst of signals is dependent upon the velocity of the conveyor 21. For example, at the rate of 300 bottles per minute, the frequency is nominally 250 Hz and at the rate of 1000 bottles per minute, the frequency is nominally 834 Hz. The outputs of the four preamplifiers AR1-AR4 are applied to two places. The first is the output of the gates 70-73 and the second is the input to the gating logic circuits of diameter logic module 52. Similarly, the bursts of signals from the trailing edge detectors are amplified by the amplifiers A5 to A8 and applied to gates 74-77 and the trailing edge module 53.

The gates 70-73 and 70-74 pass the analog signals from the preamplifiers AR1 to AR8, respectively, sequentially such that there are only leading edge signals in the leading edge preamplifier assembly 50 and trailing edge signals in the trailing edge preamplifier assembly 51.

Mixers 79, 80 and zero crossover detectors 81, 82 in each of the preamplifier assemblies 50, 51 function to produce separate signals which when taken together form measurements of the diameter of the bottle. Each measurement is proportional to the phase relationship between the pulse trains at the output of the leading edge preamplifier assembly 50 and the trailing edge preamplifier assembly 51.

DIAMETER LOGIC MODULE

Figure 16:
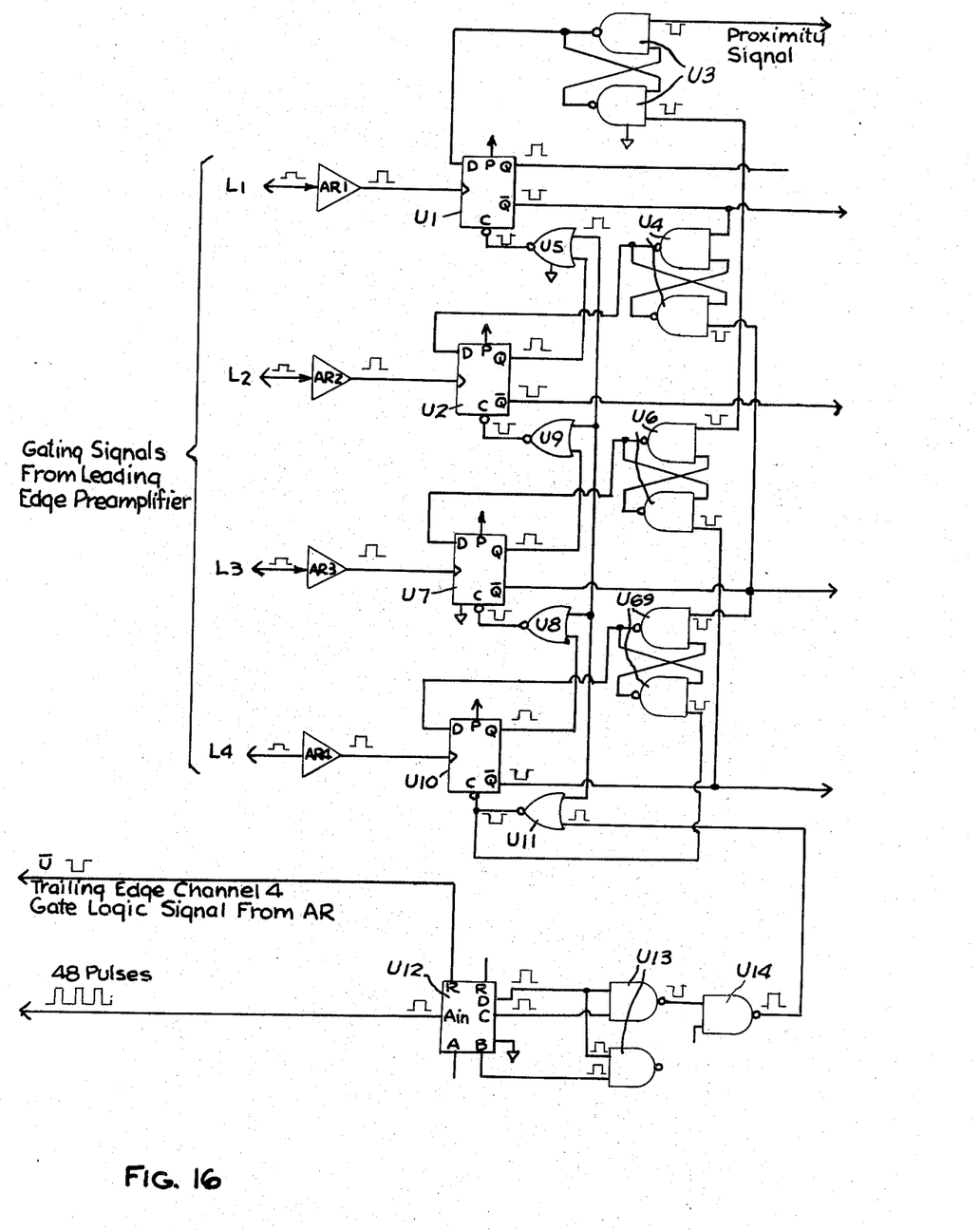
FIGS. 16 and 17 are schematic diagrams of a portion of the apparatus shown in FIG. 15.

Referring to FIG. 16, diameter logic module 52 is shown and includes the electronics for generating the gate logic signals for the leading edge preamplifier assembly 50, the 12-pulse conversion command signal, and the diameter proximity signal.

GATE LOGIC SIGNALS

Referring to FIG. 15, The gate logic signals control the analog gates 70-73 on the leading edge preamplifier assembly 50. They are generated from the gating signals which is the output of AR1 through AR4, on the same assembly as shown in FIG. 15. These signals, one for each of the four channels, are applied to the inputs of the four identical amplifiers AR1 to AR4 on the diameter logic module 52, as shown in FIG. 16.

The first burst is the leading edge signals and the second burst is the trailing edge signals. These signals are applied to the clock inputs of the dual D-type flip-flops U1 and U2 (FIG. 16). These flip-flops change state on the first positive going signal if the D-input is at a logical "1." with a logical "0" at the D-input, any clock pulse will cause the flip-flop to remain in the state in which the clear signal placed it.

The signal to the D-input of the D-type flip-flops U1 and U2 is generated by cross-coupled nand gates utilized as set-reset flip-flops. For channel 1, the two nand gates U3 comprise the set-reset flip-flop. A negative going diameter proximity signal obtained from a magnetic sensor (FIG. 1) actuated by each chuck 20 and applied to the set input causes the output of the flip-flop to change its state to a logical 1, thus enabling the D-type flip-flop U1.

The first positive going signal in the first burst of signals applied to the clock input of U1 causes flip-flop U1 to change state. Flip-flop U1 remains in this state until the clear signal resets it. The clear signal is applied from nor gate U5 which will reset flip-flop U1 when either the second channel D-type flip-flop U2 changes state or the diameter proximity signal occurs. The diameter proximity signal will cause reset, for example, if a partially broken bottle is being measured.

The $\bar{Q}$ output of channel 1 D-type flip-flop U1 is the gate logic signal to channel 1 on the leading edge preamplifier assembly 51. This signal is a negative going pulse starting at the leading edge of the first leading edge diameter measuring signal in channel 2. A logical 1 corresponds to the off mode while a logical 0 corresponds to the on mode.

When the D-type flip-flop U2 in channel 2 changes its state, the $\bar{O}$ output is applied to the reset line of the set-reset flip-flop U3 in channel 1. The enabling signal, therefore, at the D-input of U1 in channel 1 is a positive going pulse starting at the diameter proximity signal and ending at the leading edge of the gate logic signal for channel 2.

In channel 2, the set-reset flip-flop, nand gates U4, is set by the leading edge of the channel 1 gate logic signal and is reset by the leading edge of the channel 3 gate logic signal. The channel 2 D-type flip-flop U4 is enabled by this signal and changes state with the first positive going signal in the first burst of signals applied to the clock input of U2 in channel 2. This flip-flop U2 is cleared, via nor gate U9, by either the gate logic signal in channel 3 or the diameter proximity signal. The Q̄ output of U4 is the gate logic signal to channel 2 on the leading edge preamplifier. This signal is a negative going pulse starting at the leading edge of the first leading edge diameter measuring signal in channel 2 and ending with the leading edge of the first leading edge diameter measuring signal in channel 2 and ending with the leading edge of the first leading edge diameter measuring signal in channel 3. A logical 1 corresponds to the off mode while a logical 0 corresponds to the on mode.

In channel 3, the set-reset flip-flop, nand gates U6, is set by the leading edge of the channel 4 gate logic signal. The channel 3 D-type flip-flop U7 is enabled by this signal and changes state with the first positive going signal in the first burst of signals applied to the clock input of U7 in channel 3. This flip-flop U7 is cleared, via nor gate U8, by either the gate logic signal in channel 4 or the diameter proximity signal. The Q̄ output of U7 is the gate logic signal to channel 3 on the leading edge preamplifier assembly. This signal is a negative going pulse starting at the leading edge of the first leading edge diameter measuring signal in channel 3 and ending with the leading edge of the first leading edge diameter measuring signal in channel 4. A logical 1 corresponds to the off mode while a logical 0 corresponds to the on mode.

In channel 4, the set-reset flip-flop, nand gates U9, is set by the leading edge of the channel 3 gate logic signal and is reset by the clear signal to the channel 4 D-type flip-flop U10. The channel 4 D-type flip-flop U10 is enabled by this signal and changes state with the first positive going signal in the first burst of signals applied to the clock input of U10 in channel 4. The flip-flop is cleared via nor gate U11 by either a pulse conversion command signal (decode-12) or the diameter proximity signal. The decode-12 signal occurs after the last pulse in channel 4 of the trailing edge preamplifier. The Q̄ output of U10 is the gate logic signal to channel 4 on the leading edge preamplifier. This signal is a negative going pulse starting at the leading edge of the first leading edge diameter measuring signal in channel 4 and ending with the decode-12 signal. A logical 1 corresponds to the off mode while a logical 0 corresponds to the on mode.

This signal is the command that is processed to initialize the conversion process in the analog to digital converters. This signal is generated by counting the 12 trailing edge diameter measuring pulses in channel 4 of the trailing edge preamplifier 51.

The train of trailing edge diameter measuring pulses from the trailing edge preamplifier assembly 51 is applied to the input of the 4-bit binary counter U12. This counter counts on the negative going edge of the input pulse and, therefore, counts the trailing edges of the trailing edge diameter measuring pulses. The 4-bit binary counter U4 is gated on by the negative going signal. This gating signal is the trailing edge channel 4 gate logic signal from the trailing edge gating module.

The output of U12 is a binary count starting with the first diameter measuring pulse in the trailing edge fourth channel. The binary count of 13 is decoded with nand gate U13 and is inverted with nand gate line driver U14. The resulting signal is the positive going 12-pulse conversion command signal (decode-12 signal).

TRAILING EDGE MODULE

Figure 17:
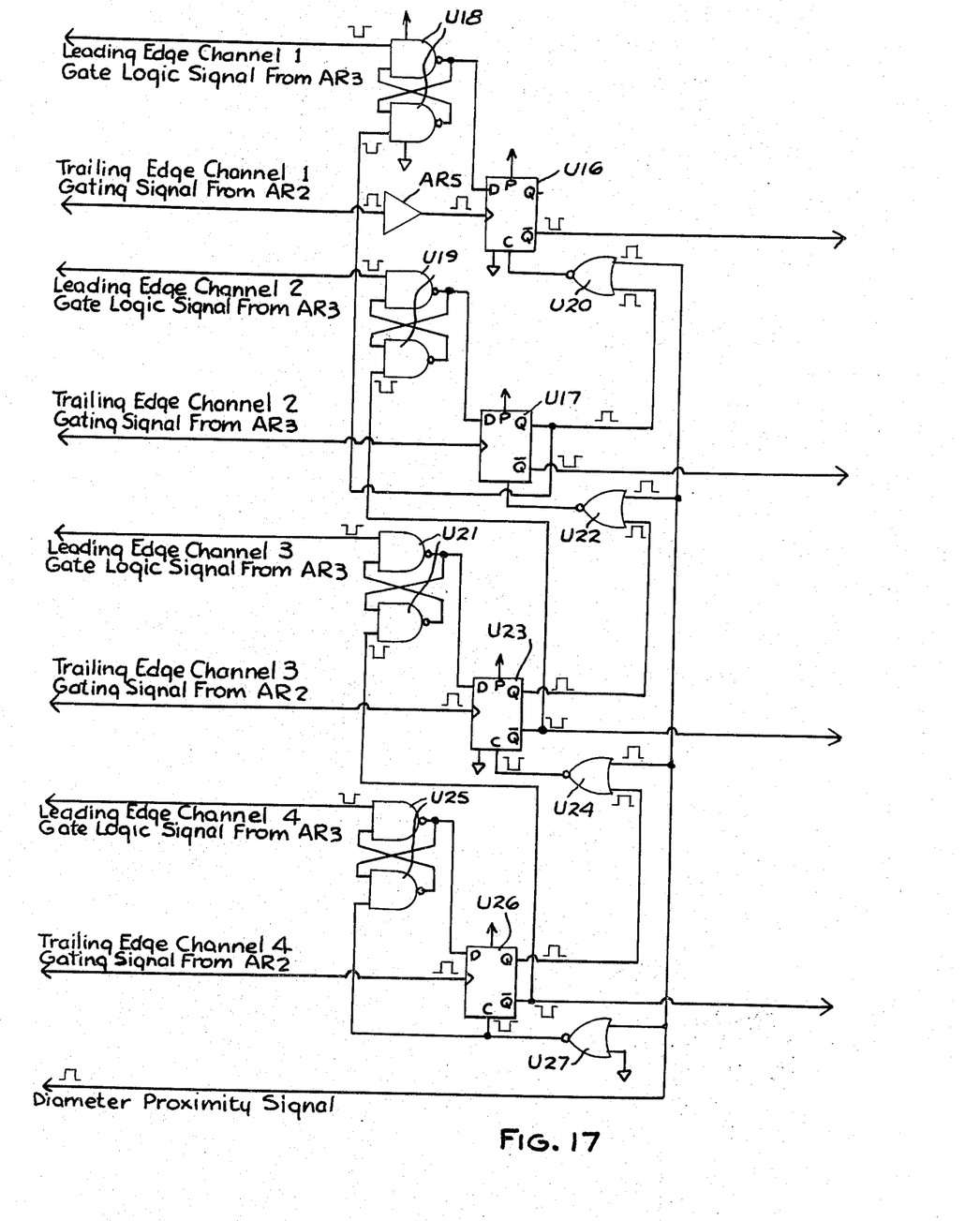

Referring to FIG. 17, the trailing edge module 53 includes the electronics for generating the gate logic signal for controlling the gates 74–77 on the trailing edge preamplifier. The gate logic signals are generated from the gating signal on the same assembly. These signals, one for each of the four channels, are applied to the inputs of four identical amplifiers AR5 through AR8.

The outputs of the amplifiers comprise a train of positive going signals in two bursts (of 12 signals each in the example given). The first burst is the leading edge signals and the second burst is the trailing edge signals. These signals are applied to the clock inputs of the dual D-type flip-flops U16 and U17. These flip-flops change state on the first positive going signal if the D-input is at a logical 1. With a logical 0 at the D-input, any click pulse will cause the flip-flop to remain in the state in which the clear signal placed it.

The signal to the D-input of the D-type flip-flops U16 and U17 are generated by cross-coupled nand gates U19 utilized as set-reset flip-flops. For channel 1, the two nand gates U19 comprise the set-reset flip-flop. The negative going leading edge channel 1 gate logic signal from the diameter logic module is applied to the set input and causes the output of the flip-flop to change its state to a logical 1, thus enabling the D-type flip-flop U16.

The first positive going signal in the second burst of signals applied to the clock input of U16 causes flip-flop U16 to change state. Flip-flop U16 remains in this state until the clear signal resets it. The clear signal is applied from nor gate U20 which will reset flip-flop U16 when either the second channel D-type flip-flop U17 changes state or the diameter proximity signal occurs. The diameter proximity signal will cause reset if a partially broken bottle is being measured.

The Q̄ output of channel 1 D-type flip-flop U16 is the trailing edge gate logic signal to channel 1 on the trailing edge preamplifier 50. This signal is a negative going pulse starting at the leading edge of the first trailing edge diameter measuring signal in channel 1 and ending with the leading edge of the first trailing edge diameter measuring signal in channel 2. A logical 1 corresponds to the off mode while a logical 0 corresponds to the on mode.

When the D-type flip-flop U17 in channel 2 changes its state the Q̄ output is applied to the reset line of the set-reset flip-flop U18 in channel 1. The enabling signal, therefore, at the D-input of U17 in channel 1 is a positive going pulse starting at the leading edge of the leading edge channel 1 gate logic signal and ending at the leading edge of the trailing edge gate logic signal for channel 2.

In channel 2, the set-reset flip-flop, nand gates U19, is set by the leading edge of the leading edge channel 2 gate logic signal and is reset by the leading edge of the trailing edge channel 3 gate logic signal. The channel 2 D-type flip-flop U17 is enabled by this signal and changes state with the first positive going signal in the second burst of signals applied to the clock input of U1 in channel 2. This flip-flop U17 is cleared, via nor gate U22, by either the trailing edge gate logic signal in channel 3 or the diameter proximity signal. The Q̄ output of U16 is the trailing edge gate logic signal to channel 2 on the trailing edge preamplifier. This signal is a negative going pulse starting at the leading edge of the first trailing edge diameter measuring signal in channel 2 and ending with the leading edge of the first trailing edge diameter measuring signal in channel 3. A logical 1 corresponds to the off mode while a logical 0 corresponds to the on mode.

In channel 3, the set-reset flip-flop, nand gates U21, is set by the leading edge of the leading edge channel 3 gate logic signal and is reset by the leading edge of the trailing edge channel 4 gate logic signal. The channel 3 D-type flip-flop U23 is enabled by this signal and changes state with the first positive going signal in the second burst of signals applied to the clock input of U2 in channel 3. This flip-flop U23 is cleared, via nor gate U24, by either the trailing edge gate logic signal in channel 4 or the diameter proximity signal. The $\overline{Q}$ output of U17 is the trailing edge gate logic signal to channel 3 on the trailing edge preamplifier 51. This signal is a negative going pulse starting at the leading edge of the first trailing edge diameter measuring signal in channel 3 and ending with the leading edge of the first trailing edge diameter measuring signal in channel 4. A logical 1 corresponds to the off mode while a logical 0 corresponds to the on mode.

In channel 4, the set-reset flip-flop, nand gates U25, is set by the leading edge of the leading edge channel 4 gate logic signal and is reset by the clear signal to the channel 4 D-type flip-flop U26. The channel 4 D-type flip-flop U26 is enabled by this signal and changes state with the first positive going signal in the second burst of signals applied to the clock input of U26 in channel 4. The flip-flop U26 is cleared, via nor gate U27, by the diameter proximity signal. The $\overline{Q}$ output of U26 is the trailing edge gate logic signal to channel 4 on the trailing edge preamplifier. This signal is a negative going pulse starting at the leading edge of the first trailing edge diameter measuring signal in channel 4 and ending with the diameter proximity signal. A logical 1 corresponds to the off mode while a logical 0 corresponds to the on mode.

BUMP GAUGING

The optical minification in this channel may be nominally 5:1. A mask, nominally 1.1 inches wide measured in object space, is employed in front of the detector. The 1.1 inch dimension is normal to the production line. The reason for the 1.1 inch mask is to eliminate the effects of bottle "runout" of ±0.0625 inches due to tilt of ±0.6°.

Although the distance between bottles is 5 inches, only 3.5 inches of linear travel is used for this measurement. This is due to the method of operation wherein the full bottle diameter is in the field of view. Bumps on either the leading or trailing lip of the bottle cause a modulation.

The spatial filter pitch is 0.2 inches for the bumpiness determination. In the second inspection station 24, the geometric arrangement of the illumination source, optics, and spatial filter with respect to the bottle is such that a good surface generates very little alternating component of signal at the detector within a finite band of frequencies. The presence of a bump, however, will cause a modulated output signal. The amplitude of modulation is related to the size of the bump. The optical discontinuity, due to a bump on the finish, will move normal to the lines on the spatial filter as the bottle spins, and thereby generating an alternating component of voltage at the detector.

Referring to FIG. 18, the signals from the detector 32 are amplified by amplifier 85, gated by a proximity signal in gate 86 into digital pulses which are compared in a comparator 87 against a reference level to produce a reject signal which is stored in a shift register 88 to actuate a reject apparatus 89 at the desired time if the defect is beyond a predetermined standard. The reject signal is also supplied through logic output 90 to a computer 91 for information storage.

It can thus be seen that there has been provided novel method and apparatus for inspecting articles and particularly the finish of glass containers for dimensional variations and for surface variations.

In the case of the dimensional variations such as the diameter of the finish, for optimum results, the width of the spacing between the lines of the spatial filter should be equal to the radial width at the object plane of the illuminated portion of the finish. In other words, one-half the pitch or cycle of the ruling of the spatial filter should be equal to the width of the illuminated diameter. In the case of inspection for variations in surface such as the bump on the finish, for optimum results, the width or spacing of the lines should be equal to the maximum peripheral width of the bump or defect in object plane. A cycle in the ruling of the spatial filter is the width of one radiating, one non-radiating, adjacent pair of parallel rulings. While spatial filters of the type herein disclosed as optimum normally are the transmitting, non-transmitting type and of equal width, they may be of unequal width rulings for the pairs or cycles. Maximum modulation is obtained when the ruling pair widths are equal. To avoid ambiguity in measurements, the variations in diameter or bump measurements cannot exceed an amount equal to the radiating portion of the spatial filter cycle. Of course, two-speed systems and other known electronic techniques may be employed to avoid such ambiguity in measurement should the variation in measurement exceed the radiating half-cycle portion of the filter.

Expressed in algebraic terms, the dimension or width of the defect to be measured should lie between $(n+f)$ of the cycles of ruling and $(n+1)$ of the cycles of the ruling where $n$ is an integer and $f$ is any fraction; and $f$ corresponds to the non-radiating portion of the cycle.

I claim:

1. The method of inspecting articles which comprises moving the articles successively and continuously through an inspection station and rotating them as they are moved through the inspection station,
   directing an image of a circular portion of the article through a spatial filter to produce a modulated light signal,
   comparing the variations in modulated light signal to a predetermined standard,
   and producing a reject signal when the variations exceed the predetermined standard by a predetermined amount.

2. The method of inspecting articles which comprises moving the articles successively and continuously through an inspection station and rotating them as they are moved through the inspection station,
   illuminating a circular portion of the article as it is moved through the inspection station,
   directing an image of the illuminated portion through a spatial filter, directing the modulated light after passage through the spatial filter onto a light-sensitive device, creating a continuously modulating signal in response to the passage of the light to the light-sensitive device, comparing said modulated signal to a predetermined standard, and producing a reject signal when the modulated light signal exceeds the standard by a predetermined amount.

3. The method of inspecting the diameters of articles which comprises moving the articles successively and continuously through an inspection station and rotating them as they are moved through the inspection station, illuminating a circular peripheral portion of each article as it is moved through the inspection station at the area the diameter of which is to be inspected, causing the leading edge of the illuminated peripheral portion of the article as it is moved through the inspection station to produce a plurality of pulses, causing the trailing edge of the illuminated peripheral portion of the article as it is moved through the inspection station to produce a plurality of pulses, comparing at any instant the time between the leading edge and trailing edge signals, and creating a signal corresponding to the time between said signals such that it is proportional to the diameter of the article.

4. The method set forth in claim 3 including the step of creating an inspecting pulse having a width corresponding to the diameter of the article, comparing the width of said pulse with a standard pulse, and creating a reject pulse when the inspecting pulse deviates from the standard pulse by a predetermined amount.

5. The method set forth in claim 4 including the step of producing a signal which has an amplitude that varies in relation to the speed of the article through the inspecting station, modifying the amplitude of said inspecting pulse in response to said last-mentioned pulse, comparing the amplitude of said modified inspecting pulse to the amplitude of said standard pulse, and creating a reject signal when the amplitude of said modified inspecting pulse exceeds the amplitude of said standard pulse by a predetermined amount.

6. An apparatus for inspecting articles comprising means for illuminating a portion of the article as it is moved through the inspection station, a spatial filter, means for directing an image of the illuminated portion through said spatial filter to produce a modulated light signal, means for comparing the variations in modulated light signal to a predetermined standard, and means for producing a reject signal when the variations exceed the predetermined standard by a predetermined amount.

7. A measuring apparatus comprising spatial filter means comprising a plurality of equally spaced rulings, each ruling including a relatively radiant area and a relatively non-radiant area which together define a space cycle, image forming means for forming an image on said spatial filter means, said image having a first edge spaced relative to a second edge by a dimension to be measured, said dimension lying between $(n + f)$ of said cycles and $(n + 1)$ of said cycles where n is any integer and f is any fraction, and detecting means for detecting the radiation from said spatial filter means, as limited by said first and said second edges, to measure said dimension.

8. The measuring apparatus of claim 7 including means for scanning an illuminated object having first and second surface areas relative to said spatial filter whereby said first and second edges, respectively, are scanned relative to said spatial filter, said detecting means further including means for sensing the time when said first edge passes one of said radiant areas relative to the time when said second edge passes another one of said radiant areas to thereby measure said dimension.

9. The measuring apparatus of claim 8 wherein said detecting means further includes means for detecting the quantum of light radiant from said spatial filter means.

10. The measuring apparatus of claim 9 wherein said radiant areas and said non-radiant areas are spaced with equal widths side by side in a series array, and wherein the fraction $f$ equals ½.

11. An apparatus for inspecting articles comprising means for moving the articles successively and continuously through an inspection station and rotating them as they are moved through the inspection station, means for illuminating a circular portion of the article as it is moved through the inspection station, a spatial filter at said inspection station, a light-sensitive device, means for directing the modulated light after passage through said spatial filter onto said light-sensitive device, means creating a continuously modulating signal in response to the passage of the light to the light-sensitive device, means for comparing said modulated signal to a predetermined standard, and means for producing a reject signal when the modulated light signal exceeds the standard by a predetermined amount.

12. an apparatus for inspecting articles comprising means for moving the articles continuously through an inspection station and rotating them as they are moved through the inspection station, means for illuminating a circular portion of the article as it is moved through the inspection station, a spatial filter, a light-sensitive device at the inspection station, means for directing the modulated light after passage through said spatial filter onto said light-sensitive device, means for creating a continuously modulating signal in response to the passage of the light to the light-sensitive device, means for comparing said modulated signal to a predetermined standard, and means for producing a reject signal when the modulated light signal exceeds the standard by a predetermined amount.

13. An apparatus for inspecting the diameters of articles comprising
  means for moving the articles continuously through an inspection station and rotating them as they are moved through the inspection station,
  means for illuminating a circular peripheral portion of the article as it is moved through the inspection station at the area the diameter of which is to be inspected,
  means for causing the leading edge of the article as it is moved through the inspection station to produce a plurality of pulses,
  means for causing the trailing edge of the article as it is moved through the inspection station to produce a plurality of pulses,
  means for comparing at any instant the time between the leading edge and trailing edge signal,
  and means for creating a signal corresponding to said time.

14. The apparatus set forth in claim 13 including the means for creating an inspecting pulse having a width corresponding to the diameter of the article,
  means for comparing the width of said pulse with the standard pulse,
  and means for creating a reject pulse when the inspecting pulse deviates from the standard pulse by a predetermined amount.

15. The apparatus set forth in claim 14 including means for producing a signal which has an amplitude that varies in relation to the speed of the article through the inspection station,
  means for modifying the amplitude of said inspecting pulse in response to said last-mentioned pulse,
  means for comparing the amplitude of said modified inspecting pulse to the amplitude of said standard pulse,
  and means for creating a reject signal when the amplitude of said modified inspecting pulse exceeds the magnitude of said standard pulse by a predetermined amount.

16. In an apparatus for inspecting articles, the combination comprising
  conveyor means for moving the articles continuously and successively through an inspection station and continually rotating the articles as they are moved through successive inspection stations,
  means at a first inspection station for illuminating a circular peripheral portion of the article,
  spatial filter means at said first inspection station having a grid spacing on which the illuminated image of the illuminated peripheral portion is directed,
  detector means for creating signals in response to passage of portions of the image through the spatial filter means,
  and means for creating an inspecting signal corresponding to the diameter of said peripheral portion,
  means at another inspection station for illuminating another peripherial portion of the article as it moves through said second station,
  spatial filter means at said second station having a grid spacing,
  detector means at said second station for creating a signal in response to variation of the image directed against said spatial filter means at said second station,
  and means for creating a signal when the last-mentioned detector means produces a signal beyond a predetermined value.

17. The combination set forth in claim 16 wherein the grid spacing of said spatial filter means at said first station is at least equal to or less than the maximum permissible deviation in the diameter.

18. The combination set forth in claim 16 wherein the grid spacing of said spatial filter means at said second station is at least equal to the minimum permissible deviation in the surface.

19. The combination set forth in claim 16 wherein the grid spacing of said spatial filter means at said first station extends transversely of the direction of movement of said article through said first inspection station.

20. The combination set forth in claim 16 wherein the grid spacing of said spatial filter means at said second station extends parallel to the direction of movement of said article through said second inspection station.

21. The combination set forth in claim 16 wherein said detector means at said first station comprises a plurality of light-sensitive detectors,
  said detectors being arranged longitudinally along the direction of travel of the article,
  each detector having a dimension in the longitudinal direction in the direction of travel which is less than the nominal diameter of the article being inspected.

22. The combination set forth in claim 16 wherein said detector means at said first station comprises a first set of detectors extending along the path of the article and a second set of detectors along the path of the article,
  said two sets of detectors being spaced longitudinally by a distance corresponding to the nominal dimension of the diameter of the article being inspected 23. The combination set forth in claim 22 including means for cyclically activating each of said detectors in each set so that only one will be energized at a time to prevent false signals.

24. The comination set forth in claim 16 including means responsive to the speed of the movement of the articles through the inspection station for producing a modifying signal.

25. In an apparatus for inspecting articles, the combination comprising
  conveyor means for moving the articles continuously and successively through an inspection station and continually rotating the articles as they are moved through an inspection station,
  means for illuminating a circular peripheral portion of the article,
  spatial grid means at the inspection station on which the illuminated image of the illuminated peripheral portion is directed,
  detector means for creating signals in response to passage of portions of the image through the spatial grid means,
  and means for creating an inspecting signal responsive to the diameter of said peripheral portion.

26. The combination set forth in claim 25 wherein the grid spacing of said spatial grid means is at least equal to or less than the maximum permissible deviation in the diameter.

27. The combination set forth in claim 25 wherein said spatial grid means extends transversely of the direction of movement of said article through said first inspection station.

28. The combination set forth in claim 25 wherein said detector means comprises a plurality of light-sensitive detectors,
said detectors being arranged longitudinally along the direction of travel of the article,
each detector having a dimension in the longitudinal direction in the direction of travel which is less than the nominal diameter of the article being inspected.

29. The combination set forth in claim 28 wherein said detector means comprises a first set of detectors extending along the path of the article and a second set of detectors along the path of the article,
the two sets of detectors being spaced longitudinally by a distance corresponding to the nominal dimension of the diameter of the article being inspected.

30. The combination set forth in claim 29 including means for cyclically activating each of said detectors in each set so that only one will be energized at a time to prevent false signals.

31. The combination set forth in claim 25 including means responsive to the speed of the movement of the articles through the inspection station for modifying said inspecting signal in proportion to said speed.

32. The method of inspecting the finish of a hollow article made of translucent material which comprises
directing a beam of radiant energy against the finish,
positioning a light-sensitive element in the path of the illuminated image,
positioning a spatial filter between the illuminated image and light-sensitive element,
creating signals from the periphery of the finish in response to variations on the light-sensitive element,
and creating an inspecting signal corresponding to the signals from the image.

33. The method of inspecting the circular finish of a hollow article made of translucent material which comprises
moving the articles continuously and successively through an inspection station and rotating them as they are moved through the inspection station,
directing radiant energy against the article to illuminate the circular finish of the article,
focusing an image of the illuminated finish on longitudinally spaced sets of light-sensitive elements,
positioning spatial filters having grid rulings between the line of sight of the finish and the sets of light-sensitive elements with their rulings extending tranversely of the direction of the movement of the articles through the inspection station,
causing one set of light-sensitive elements to produce a plurality of pulses corresponding to the leading edges of the image,
causing the other set of light-sensitive elements to produce a plurality of pulses corresponding to the trailing edges of the image,
generating a plurality of square waves having a width proportional to the displacement of the two sets of pulses,
and integrating the square waves to produce a d.c. voltage proportional to the width of the square wave.

34. The method set forth in claim 33 including the step of producing a d.c. voltage corresponding to the velocity of the articles through the inspection station,
and modifying the magnitude of the square waves in accordance with the variations of magnitude in the d.c. voltage from the velocity measurement.

35. An apparatus for inspecting the finish of a hollow article made of translucent material which comprises
means for directing a beam of radiant energy in a path against the finish,
a light-sensitive element in the path of the beam,
a spatial filter between the illuminated image and light-sensitive element,
and means for creating an inspecting signal corresponding to the signals from the peripheral portions of the image.

36. The apparatus set forth in claim 35 including means producing a d.c. voltage corresponding to the velocity of the articles through the inspection station,
and means modifying the magnitude of the square waves in accordance with the variations of magnitude in the d.c. voltage from the velocity measurement.

37. An apparatus for inspecting the circular finish of a hollow article made of translucent material comprising
means for moving the articles continuously and successively through an inspection station and rotating them as they are moved through the inspection station,
means for directing radiant energy against the article to illuminate the finish of the article,
longitudinally spaced sets of light-sensitive elements,
means for focusing an image of the illuminated finish on said longitudinally spaced sets of light-sensitive elements,
spatial filters between the line of sight of the finish and the sets of light-sensitive elements with their rulings extending transversely of the direction of the movement of the articles through the inspection station,
one set of light-sensitive elements producing a plurality of pulses corresponding to the leading edges of the image and the other set of light-sensitive elements producing a plurality of pulses corresponding to the trailing edges of the image,
means for generating a plurality of square waves having a width proportional to the displacement of the two sets of pulses,
and means integrating the square waves to produce a d.c. voltage proportional to the width of the square wave.

* * * * *